UNITED STATES PATENT OFFICE.

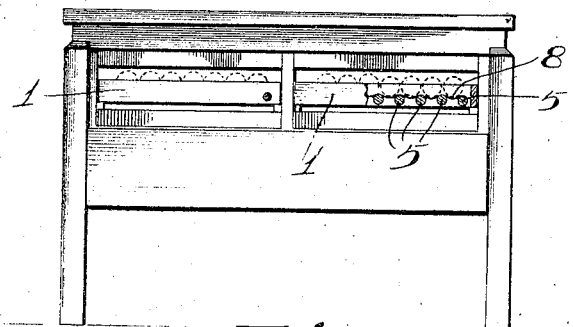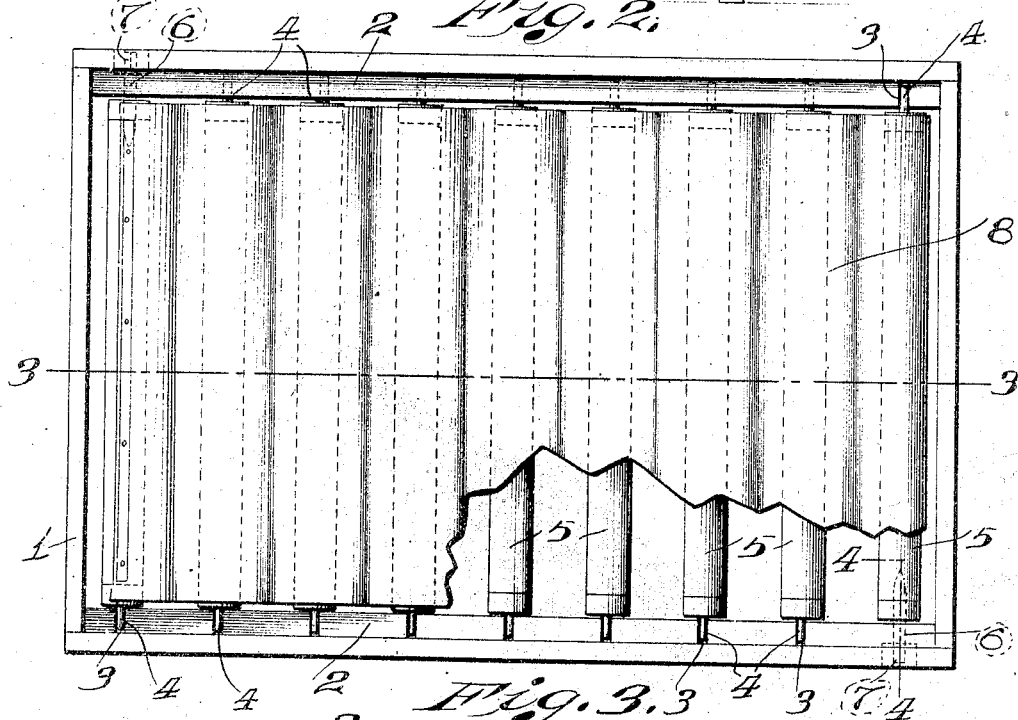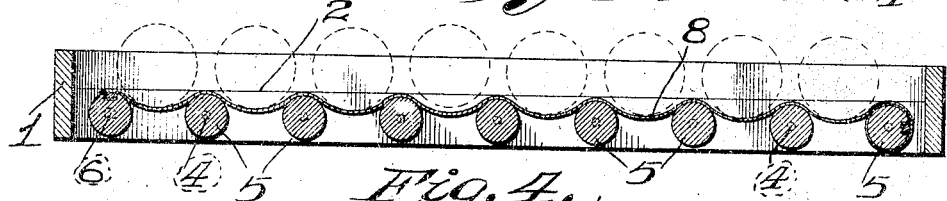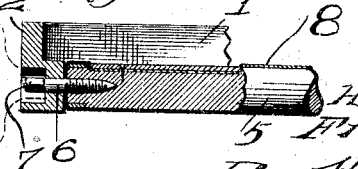

HERMAN HARTLIEB AND FRIEDRICH LIND, OF ST. LOUIS, MISSOURI.

EGG-TURNER FOR INCUBATORS.

969,277.

Specification of Letters Patent. Patented Sept. 6, 1910.

Application filed July 6, 1908. Serial No. 442,153.

*To all whom it may concern:*

Be it known that we, HERMAN HARTLIEB and FRIEDRICH LIND, citizens of the United States, and residents of St. Louis, Missouri, have invented certain new and useful Improvements in Egg-Turners for Incubators, of which the following is a specification containing a full, clear, and exact description, reference being had to the accompanying drawings, forming a part hereof.

Our invention relates to an egg turner for incubators, our object being to construct a simple, inexpensive egg holding tray such as is ordinarily used in incubators, and to provide said tray with simple, easily operated means whereby all of the eggs arranged on the tray may be simultaneously turned, which action is necessary during the period of incubation.

To the above purposes, our invention consists in certain novel features of construction and arrangement of parts, which will be hereinafter more fully set forth, pointed out in the claim, and illustrated in the accompanying drawings, in which:

Figure 1 is a front elevation of an incubator with the front door thereof swung open, and showing egg trays therein equipped with our improved turning means; a portion of one of the egg trays being shown in vertical section; Fig. 2 is a plan view of one of the trays with a portion of the apron broken away; Fig. 3 is a section taken on the line 3—3 of Fig. 2; and, Fig. 4 is a detail section taken on the line 4—4 of Fig. 2.

Referring by numerals to the accompanying drawing: 1 designates a rectangular frame, preferably constructed of wood, and of such size as to readily fit on the supporting rails within the incubator, and fixed against the inner faces and lower portions of the front and rear rails of this frame 1 is a pair of strips 2, in the top of one of which is formed, at suitable distances apart, notches 3, there being recesses formed in the opposite strip 2, which notches and recesses form bearings for trunnions 4 formed on or carried by the ends of a series of transversely disposed rollers 5.

One of the trunnions 6 of each end roller extends through the corresponding strip 2 and the outer end of said trunnion is made non-circular, as designated by 7, in order to receive a key, as shown by dotted lines in Fig. 4, which key is for the purpose of rotating said end rollers.

8 designates an apron of cloth or analogous flexible material, the ends of which are fixed in any suitable manner to the two end rollers 5, and said apron is of such length or of such fullness as that depressions or pockets are formed between the rollers 5, which depressions are occupied by the rows of eggs.

A portion of the apron 8 at one end is wound upon the corresponding end roller 5 so that when the opposite end roller is rotated by means of the key, a corresponding amount of the apron will be wound upon said opposite roller, and that portion of the apron lying upon and between the intermediate rollers will be shifted in such a manner as that the eggs carried upon said apron will be rotated approximately a half turn, thus quickly and simultaneously turning all of said eggs.

By our improved arrangement and construction it is not necessary to touch the eggs with the hands during the turning operation; and as the apron is constructed of cloth or analogous material the eggs are maintained upon a comparatively soft surface, and therefore the danger of breakage during the turning operation is reduced to a minimum.

A tray and turning device of our improved construction is applicable for all forms of incubators, and can also be advantageously used in egg cases and the like, where eggs are packed for storage, and where it is necessary to turn the eggs at certain intervals.

We claim:

In an egg tray for incubators, a rectangular frame having diagonally oppositely disposed openings, one through the rear wall adjacent its left hand end and one through the front wall adjacent its right hand end, a strip secured to the rear wall, there being a series of openings formed through said strip, a strip secured to the front wall and there being a series of notches in said strip, rollers provided with trunnions rotatably mounted in said latter openings and notches, the trunnions of the end rollers projecting through said diagonally, oppositely disposed openings in the front and rear walls, said projecting ends being non-circular, an apron secured to said end rollers, said apron being of such length as to form pockets or depressions between each pair of rollers and permit a portion to be wound upon one of the end rollers.

In testimony whereof, we have signed our names to this specification, in presence of two subscribing witnesses.

HERMAN HARTLIEB.
FRIEDRICH LIND.

Witnesses:
E. L. WALLACE,
N. G. BUTLER.